Nov. 26, 1968  H. L. FUNK  3,413,065
DIGITAL SCANNING DENSITOMETER
Filed Sept. 23, 1964  2 Sheets-Sheet 1

INVENTOR.
HOWARD L. FUNK
BY *John J. Goodwin*
ATTORNEY

United States Patent Office 3,413,065
Patented Nov. 26, 1968

3,413,065
DIGITAL SCANNING DENSITOMETER
Howard L. Funk, Yorktown Heights, N.Y., assignor to International Business Machines Corporation, New York, N.Y., a corporation of New York
Filed Sept. 23, 1964, Ser. No. 398,635
9 Claims. (Cl. 356—202)

ABSTRACT OF THE DISCLOSURE

A variable density filter is used to provide a plurality of values of light intensity to a plurality of photocells connected by fiber optics to a viewing block of a photometer. A digital output is provided by connecting the photocells through threshold circuits to a level detector seriatim by means of a scanning ramp (sawtooth) voltage. The number of pulses produced is recorded in a counter indicative of the optical density of the sample body.

---

The present invention relates to light responsive devices and more particularly to a light responsive device which may be employed as a densitometer. The term density as employed in the present discussion relates to the light absorbing and light transmitting properties of a film such as a photographic plate. A film having a high density value absorbs light rather than transmits it and a film having a low density value tends to transmit light rather than absorb it. The instrument used for determining the density of a particular film is known as a densitometer. There is a great variety of types of densitometers but the underlying principle of all of them is the same. The intensity of the radiant energy from a source which is maintained as nearly constant as is possible is compared by any of the methods of photometry with the intensity of the same radiation after it has passed through the portion of the film whose density is to be determined. Photometry is the measurement of illumination or luminous intensity. Thus, a densitometer usually includes a photometer which measures the light intensity of a source before and after being directed through the specimen film. The ratio of the two intensities is the optical density. Thus, optical density D is defined by the expression:

$$D = \log_{10} P_o/P_t \qquad (1)$$

where $P_o$ is the flux of radiant energy measured by the photometer when the specimen is not in place and $P_t$ is the flux of radiant energy measured by the same photometer when the sample is in place.

Most available densitometers provide an analog output signal representative of the density of a sample, and it is an object of the present invention to provide an improved densitometer which presents a direct digital output signal representative of the optical density of a sample.

A further object of the present invention is to provide an improved densitometer which provides an output signal representative of the logarithm of the ratio of radiant energy received by a photometer before and after being passed through a sample.

A still further object of the present invention is to provide an improved densitometer including a semiconductor radiation scanner.

The foregoing and other objects, features and advantages of the invention will be apparent from the following more particular description of preferred embodiments of the invention, as illustrated in the drawings.

Figure 1:
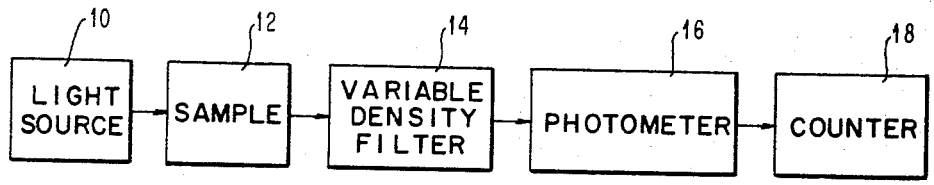
FIG. 1 is a functional block diagram of a densitometer embodiment following the principles of the present invention.

Referring to FIG. 1, a functional block diagram is illustrated showing the basic elements of the present invention. A light source 10 directs a beam of light through a sample film 12 and then through a variable density filter 14 to a photometer 16. The output of the photometer 16 is applied to a digital counter 18. Variable density filter 14 varies logarithmically in density throughout its length, with one extreme end thereof being relatively transparent and the other extreme end thereof being relatively opaque. Without sample 12 in place, a strip of light is applied to photometer 16 via filter 14 which logarithmically varies in flux density of the light beam passed through it from a maximum value of flux of the light from source 10 through one end of the filter to a minimum value of flux through the other end of the filter.

The photometer 16 which is receptive to the variable intensity strip of light is linearly scanned from end to end and is designed to generate a series of pulses during the scan as long as light is being received. The pulses so generated from photometer 16 have amplitudes representative of the light intensity and are applied to counter 18 and cause counter 18 to count down from an initial value to zero. Thus, without sample 12 in place, photometer 16 will be illuminated from end to end and a series of pulses will be produced over the entire scan, causing counter 18 to count down from maximum to zero. Photometer 16 includes a level detecting circuit which is set at the amplitude of the smallest pulse so produced. The smallest pulse will be produced by the light passing through the most opaque end of filter 14. This smallest pulse will be hereinafter referred to as the minimum pulse. Any pulse smaller than this minimum pulse will not pass through the level detector and operate counter 18.

With sample 12 in place, however, the density of the sample combined with the variable density of filter 14 will reduce the overall intensity of the light strip reaching photometer 16. Light will be directed through filter 14 from the more transparent end to some point along the filter where the density of the filter at that point added to the density of the sample passes the same amount of radiant flux as was previously passed by the most opaque end of variable filter 14 when the sample was not in place. From that point on to the more opaque end of filter 14 the intensity of the light that reaches photometer 16 is less than the light intensity which passed through the most opaque end of filter 14 when sample 12 was not in place. In such instance output pulses generated during the scan after the point at which the sample 12 and the filter 14 combine to pass the same intensity of light as usually passed by the more opaque end of filter 14 alone will have pulse amplitudes less than the minimum amplitude pulse generated when sample 12 was not in place. The result is that the level detecting circuit prevents such below minimum pulses from reaching counter 18 so that counter 18 does not count down to zero but instead is stopped when no further pulses from photometer 16 occur. This is the point at which the sample 12 and the filter 14 combine to allow only as much light to reach photometer 16 as previously allowed by the end of filter 14. A count therefore remains in counter 18 which is the optical density value of the sample 12. The greater the density of the sample, the closer to the more transparent end of filter 14 will be such combined point, which will be referred to as the minimum light cut-off point. The closer to the more transparent end of filter 14 that the minimum light cut-off point occurs, the fewer will the output pulse from photometer 16 be before the minimum pulse occurs and the higher will be the density figure in counter 18.

Sample 12 will have the greatest optical density when it is totally opaque and in such instance no light will reach and pass through filter 14, even at its most transparent end. There being no light reaching photometer 16, no pulses are generated during the scan and counter 18 remains at its maximum value, indicating maximum density. If the sample 12 were completely transparent, it would be the same as if it were not in place and as stated previously, output pulses would be generated by photometer 16 over its entire scan and counter 18 would count down to zero, thereby indicating minimum density. For densities of samples between opaque and transparent the counter will count down to a figure which is the direct digital value of the particular density.

To illustrate, presume that with sample 12 removed the light from source 10 passes through the variable density filter 14 such that the radiant energy flux reaching the portion of the photometer 16 through the most transparent end of the filter is 10,000 times the amount of radiant energy flux reaching the portion of the photometer through the more opaque end. Considering the density of the transparent end of filter 14 to be set at 0.000 ($\log_{10} 1 = 0.000$), the density of the almost opaque end will be 4.000 (i.e., $\log_{10} 10,000 = 4.000$). For explanation consider that one unit of radiant energy flux is passed through the more transparent end and that $1/10,000$ of a unit passes through the more opaque end of filter 14 when sample 12 is not in place.

If a sample having a uniform density is placed as shown in FIG. 1 and if such sample has a density which passed $1/20$ of a unit of radiant energy flux and if the linear distance of the filter 14 is logarithmically divided into 10,000 units with sample 12 in place, the entire filter 14 receiving only $1/20$ as much radiant energy flux so that the same amount of light previously passed by the most opaque end of filter 14 alone is now passed by the combined sample and filter at a distance from the more transparent end which has an opacity value of 500 ($1/20$ of 10,000). Thus, the minimum light cut-off point will be at the 500th unit on the logarithmic scale.

Photometer 16 is linearly scanned from end to end and will produce 4,000 separate pulses with the last pulse being the minimum amplitude pulse if only filter 14 were in place and sample 12 removed. In the present example, with sample 12 in place, the minimum light cut-off is at the 500th logarithmic unit of the filter 14 so that photometer 16 produces pulses which are initially smaller with the minimum pulse occurring when the scan reaches the equivalent of the 500th logarithmic unit of filter 14. Thus, photometer 16 produces only 2,699 pulses ($\log_{10} 500 = 2.699$)

before the minimum pulse occurs. Since the level detection circuit on photometer 16 prevents any pulses less than the minimum pulse from reaching counter 18, counter 18 counts down from 4.000 to a value 1.301 (i.e., 4.000−2.699), which is the optical density of the sample 12.

This can be verified by using Equation 1 where $P_o$ is 1 unit and $P_t$ is $1/20$ of a unit.

$$D = \log_{10} \frac{1}{1/20} = \log_{10} 20 = 1.301$$

Referring again to FIG. 1, the elements of the present embodiment are a light source 10, a variable density filter 14 having a denity which varies from a minimum to a maximum value in a logarithmic fashion, and a digital counter 18 which is incremented one unit in response to each input pulse applied thereto. These elements are well known and easily obtainable. The sample 12 is of course a uniform density film, the density of which is to be determined.

Photometer 16 is a device which is light responsive to the light passing through the length of filter 14 from maximum to minimum end. The responsiveness of the photometer should be linearly discrete so that it may be determined at which points along the length thereof given intensities of light are applied. The photometer also includes a linear scanning means which scans the element from end to end and causes a series of varying amplitude pulses to be produced in response to light applied to the photoresponsive portion and a level detection circuit which passes only pulses equal to or above a given amplitude.

Figure 2:
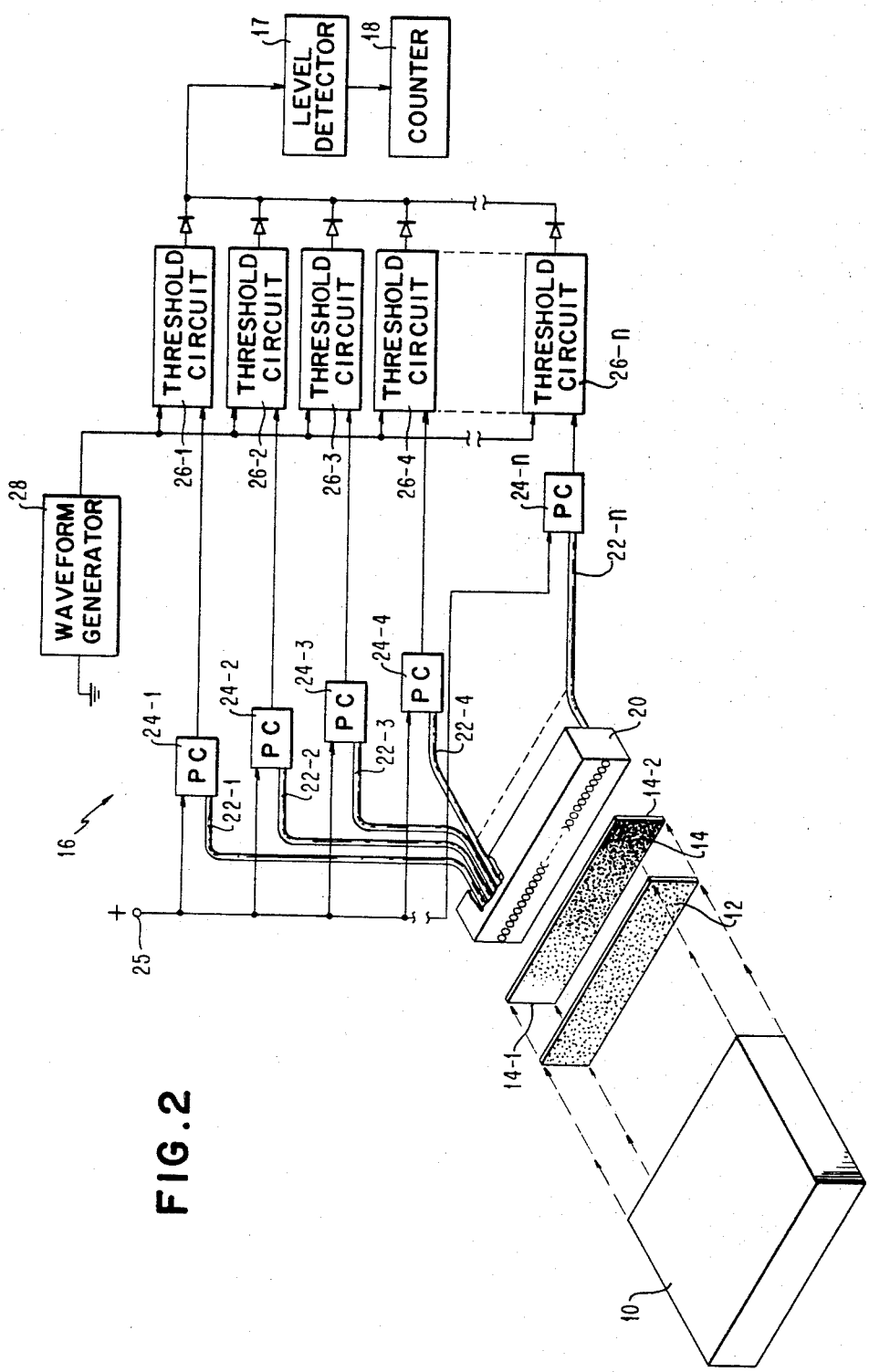
FIG. 2 is a schematic block diagram of an embodiment of a densitometer following the principles of the present invention.

In FIG. 2 a photometer is shown which satisfies these requirements. In FIG. 2 the light source 10, the sample 12, the variable density filter 14, and the counter 18 are more or less graphically depicted, with photometer 16 both graphically and schematically shown. In FIG. 2 photometer 16 includes an opaque block 20 embedded in which are a plurality of light conducting fibers 22–1 through 22–$n$. For sake of explanation, presume that there are 4,000 such light fibers. The fibers are arranged linearly and extend the linear length of the variable density filter 14. Each of the light fibers is capable of transmitting light directed thereon to a separate body of photoconductive material 24–1 through 24–$n$. The photoconductive material used in bodies 24–1 through 24–$n$ may be any of those materials that have the property that their electrical resistance decreases significantly in response to light energy directed thereon.

Each of the photoconductive bodies 24–1 through 24–$n$ is connected to a potential source 25 so that an electrical signal is produced at the output thereof when light is applied via the associated light fiber. The amplitude of the electrical signal at the output of each photoconductive body is proportional to the light intensity directed on its associated light fiber because the light intensity determines the amount of decrease in resistance of the body. The output of each of the photoconductive bodies 24–1 through 24–$n$ is connected to a separate one of threshold gate circuits 26–1 through 26–$n$. Each of the threshold gate circuits 26–1 through 26–$n$ is designed to gate the signal from its associated photoconductive body at a different signal level. The threshold gate circuits 26–1 through 26–$n$ are all coupled to a waveform generator 28 which produces a linear ramp signal. When the ramp signal from generator 28 is applied, each of the threshold gate circuits 26–1 through 26–$n$ are sequentially gated in that order. When gated, each of the threshold gate circuits 26–1 through 26–$n$ will conduct the electrical signal (if present) from its associated input photoconductive body to level detection circuit 17, the output of which is connected to counter 18. The signals from threshold gate circuits 26–1 through 26–$n$ occur in sequence, and if all are present, they will cause counter 18 to count down in increments from $\log_{10} n$ to 0.000. The amplitude of the $n$th pulse generated when sample 12 is not in place is the minimum pulse and thus determines the level setting of level detection circuit 17.

Thus, in the previously described example $n$ is 10,000, counter 18 is initially set at 4.000 and the sample 12 has a density such that it will pass $1/20$ of a unit of radiant energy flux. The end of variable density filter 14 designated 14–1 will pass 1 unit of flux and the end designated 14–2 will pass $1/10,000$ of a unit of flux. With sample 12 in place the same intensity of light will pass through filter 14 at the $1/500$ logarithmic point from end 14–1 as would have passed through the $1/10,000$ logarithmic point with sample 12 removed, which means that of the light fibers 22–1 through 22–4,000, only the fibers 22–1 through 22–2,699 will have light directed thereon having an intensity sufficient to lower the electrical resistance of their associated photoconductive bodies 24–1 through 24–2,699 to the point where an output pulse equal to or greater than the minimum pulse can be produced. Thus, only threshold gate circuits 26–1 through 26–2,699 will have an input signal applied thereto equal to or greater than the minimum pulse so that when the scan signal from source 28 is applied only a sequence of output pulses from threshold gate circuits 26–1 through 26–2,699 will be able to pass level detection circuit 17 and be applied to counter 18. The 2,699 sequential pulses applied to counter 18 causes it to count from 4.000 to 1.301, which is the density value of sample 12. Thus, light applied to fibers 22–700 through 22–4,000 with sample 12 in place is not intense enough to lower the resistances of photoconductive bodies 24–700 through 24–4,000 such that pulses greater than the minimum value are produced. Thus, the pulses from the associated threshold circuits 26–700 through 26–4,000 are too small to pass level detector circuit 17 and affect counter 18.

Figure 3:
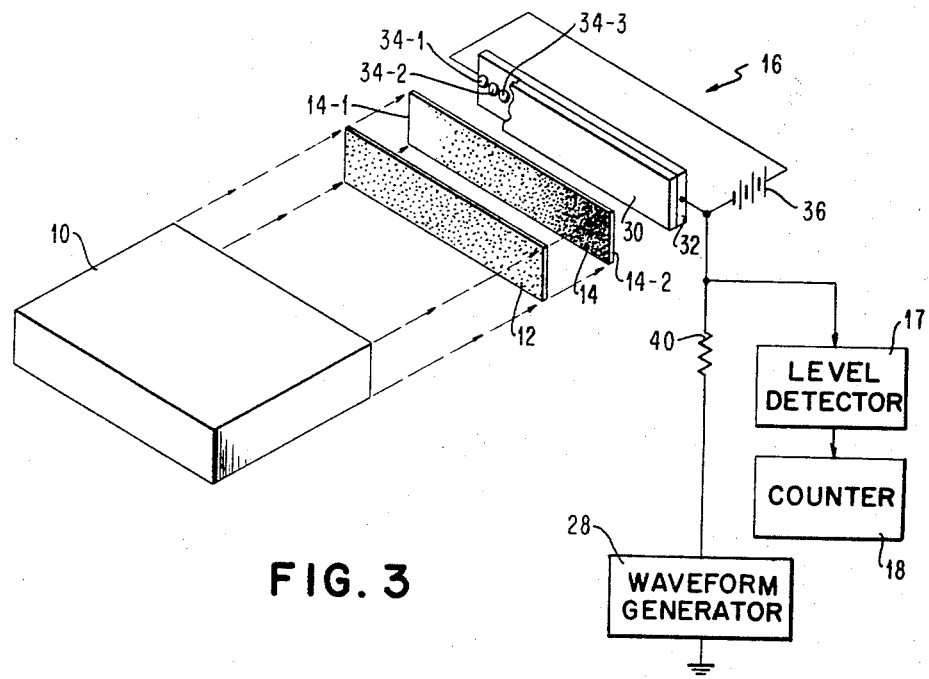
FIG. 3 is a schematic block diagram of another densitometer embodiment following the principles of the present invention employing a semiconductor radiation scanner.

The photometer arrangement shown in FIG. 2 is relatively complex and involves a large number of functional units. A preferred photometer device for use in the present densitometer system is shown in FIG. 3. The device employed as photometer 16 in FIG. 3 is basically a radiation scanner composed of semiconductor material. Two layers of similar conductivity type (i.e., N type) are disposed such that the first layer 30 faces variable filter 14 and the second layer 32 is located behind layer 30. Sandwiched between the layers 30 and 32 are a plurality of dots 34–1 through 34–n (only dots 34–1 through 34–3 being shown). Dots 34–1 through 34–n are of an opposite conductivity type to that of layers 30 and 32 (i.e., P type) and are connected to the layers by junctions. The junction of each of the dots 34–1 through 34–n with the layers 30 and 32 form a pair of oppositely poled asymmetrically conductive semiconductor junctions, the equivalent of which would be a pair of back to back diodes. Layer 30 is light responsive and generates minority carriers when light is directed thereon, the number of minority carriers generated being a function of the light intensity. Layer 30 also acts equivalent to a voltage divider circuit along its length. The minority carriers produced in layer 30 tend to result in photocurrents which will be conducted through the junctions formed by the dots 34–1 through 34–n. Thus, the magnitude of the photocurrents are also dependent on the light intensity. A bias source (battery 36) forward biases the junctions, however, and no current flows. Also, because of the voltage divider effect of layer 30 a different value of signal will be necessary to reverse bias each of the junctions associated with the separate dots 34–1 through 34–n. A ramp waveform generator 28 similar to that of FIG. 2 is provided and is applied across the layer 32. As the ramp signal is applied each of the junctions associated with the dots 34–1 through 34–n are reverse biased and photocurrents present are permitted to flow. This results in a sequence of varying amplitude output pulses appearing across resistor 40. If no light is directed onto portions of layer 30, then no currents are produced and consequently or pulses are produced from the dot junctions immediately thereunderneath. With only filter 14 in place the amplitude of the photocurrent produced by the light from the most opaque end of the filter 14 is the minimum pulse and determines the level of level detector circuit 17.

Presume the same conditions as in the case of FIG. 2 (sample 12 in place) and presume there are 4,000 separate dots 34–1 through 34–4,000. As in FIG. 2 only the intensity of the light passed through filter 14 such as to fall on a portion of layer 30 covering dots 34–1 through 34–2,699 will be sufficient to produce photocurrents equal to or greater than the minimum pulse. When the ramp signal from source 38 is applied the junctions associated with all the dots 34–1 through 34–4,000 are sequentially reverse biased in that order, however, current pulses greater than or equal to the minimum pulse will flow only through the junctions associated with dots 34–1 through 34–2,699 resulting in 2,699 output pulses equal to or greater than the minimum pulse occurring in sequence across resistor 40. Only these 2,699 pulses will be passed by level detector circuit 17 and counter 18, initially set to 4.000 will count down to a value 1.301 just as in the example of FIG. 2. The pulses produced by the rest of the junctions will not be of sufficient amplitude (below minimum pulse) to pass through level detection circuit 17.

The radiation scanner of FIG. 3 is not, in and of itself, novel but is described separately in U.S. patent application, Ser. No. 279,531, filed May 10, 1963, now United States Patent No. 3,317,733 of Horton et al. entitled "Radiation Scanner Employing Rectifying Devices and Photoconductors," assigned to the present assignee wherein further details as to the operation of such type scanner may be obtained.

What has been described is a novel densitometer which provides a direct digital output rather than an analog indication. A densitometer of this type is useful since it can be employed directly as a computer input terminal without the necessity of an analog to digital converter.

The system as described may be used for monochromatic density determinations. For determining the density of a color film three such systems may be used with appropriate color filters.

While the invention has been particularly shown and described with reference to preferred embodiments thereof, it will be understood by those skilled in the art that various changes in form and details may be made therein without departing from the spirit and scope of the invention.

What is claimed is:

1. A system for determining the optical density of a sample body comprising:
    means for directing input radiant energy at a sample body;
    variable density filter means for filtering the portion of said input radiant energy passing from a said sample body for selectively filtering said radiant energy;
    sensing means responsive to said radiant energy passing from said sample body and selectively filtered through said filter for concurrently providing a plurality of output signals representative of the amplitude of said selectively filtered radiant energy;
    level detecting means for detecting a shift of the level of output of said sensing means across a predetermined level and producing a change in output signal in response thereto, and counter means coupled to said level detecting means for providing a digital count in response to said output signal of said level detecting means, said digital count being the value of the optical density of said sample body.

2. A system according to claim 1 wherein said variable density filter means comprises an optical filter having a given length, and wherein the optical density of said filter varies from a minimum to a maximum value along said given length.

3. A system according to claim 2 wherein said sensing means includes a plurality of separate adjacent radiant energy responsive elements linearly disposed along a given length, each of said radiant energy responsive elements producing a separate electrical signal in response to radiant energy disposed thereon;
    and a ramp signal generating means coupled to said radiant energy responsive means for sequentially gating the separate electrical signals from said radiant energy responsive elements.

4. A system according to claim 3 wherein said sensing means includes first and second layers of semiconductor material of a first conductivity type joined together and having a plurality of separate dots of second conductivity type semiconductor material disposed between said junction, said separate dots of second conductivity type semiconductor material being disposed linearly equi-spaced along the length of said first and second layers,
one of said layers having a source of bias potential connected across the length thereof.

5. A system for determining the optical density of a sample body comprising:
a light source directing a beam of light to said sample body having a given optical density;
a variable density filter adjacent to said sample body for filtering the light directed from said sample body, said filter having an optical density which varies logarithmically through $n$, where $n$ is an arbitrarily selected integer greater than 1, density units along the length thereof;
a light responsive means adjacent to said filter and responsive to the light filtered therethrough, said light responsive means including $n$ separate light responsive elements linearly disposed and equally spaced along the length thereof coextensive with said adjacent filter, said $n$ separate light responsive elements each generating a separate electrical output signal in response to light directed thereon;
said light responsive means further including a ramp signal generator for applying a ramp signal to said $n$ light responsive elements for sequentially gating the separate electrical output signals therefrom;
level detecting means for discriminating between levels of output signals above and below a predetermined level cooperating with said light responsive elements and said ramp signal generator;
and counting means coupled to said level detecting means and initially set at a digital value equal to $\log_{10} n$ and counting down in increments in response to said separate electrical signals sequentially gated from said light responsive means.

6. A system according to claim 5 wherein each of said separate electrical output signals generated by said $n$ separate light responsive elements each have a different amplitude varying between an initial maximum value to a minimum valued $n$th electrical signal in response to a light beam directed thereon solely through said variable density filter.

7. A system according to claim 6 wherein said light responsive means includes a level detecting circuit having an output coupled to said counting means for transmitting thereto only electrical output signals having an amplitude at least equal to said minimum value.

8. A system according to claim 7 wherein said given optical density of said sample body combined with the optical density of said variable density filter result in a reduction of said light beam radiant energy flux directed onto said light respsonsive means;
and wherein only $x$, where $x$ is an unknown integer, of said $n$ light responsive elements of said light responsive means having said reduced radiant energy flux light applied thereto generate only $x$ separate electrical output signals from said light responsive means which are at least equal to said minimum value;
and wherein said $n$ separate electrical output signals are sequentially gated and applied to said level detection circuit, said level detection circuit passing only said $x$ electrical signals at least equal to said minimum value to said counting means producing a resultant count of $\log_{10} n - x$ increments, said resultant count being a digital representation of said given optical density of said sample body.

9. A system according to claim 8 wherein said light responsive means includes first and second layers of semiconductor material of a first conductivity type joined together and having $n$ separate dots of second conductivity type semiconductor material disposed between said junction, said $n$ separate dots of second conductivity type semiconductor material being disposed linearly equi-spaced along the length of said first and second layers,
one of said layers having a source of bias potential connected across the length thereof.

References Cited
UNITED STATES PATENTS

| | | | |
|---|---|---|---|
| 2,478,406 | 8/1949 | Lamb | 88—14 |
| 2,733,358 | 1/1956 | Carapellotti | 324—121 X |
| 2,872,641 | 2/1959 | Hudson et al. | 324—99 X |
| 2,883,649 | 4/1959 | King | 324—97 |
| 3,238,454 | 3/1966 | Martens | 324—97 X |
| 3,249,759 | 5/1966 | Sendro | 324—96 X |
| 3,317,733 | 5/1967 | Horton et al. | 250—211 |
| 3,328,587 | 6/1967 | Brown et al. | 88—14 X |

JEWELL H. PEDERSEN, *Primary Examiner.*

W. A. SKLAR, *Assisstant Examiner.*